United States Patent
Menzel

(10) Patent No.: US 12,196,726 B2
(45) Date of Patent: Jan. 14, 2025

(54) TESTING OF FILTRATION DEVICE

(71) Applicant: Cytiva Sweden AB, Uppsala (SE)

(72) Inventor: Stephan Menzel, Korschenbroich (DE)

(73) Assignee: Cytiva Sweden AB, Uppsala (SE)

( * ) Notice: Subject to any disclaimer, the term of this patent is extended or adjusted under 35 U.S.C. 154(b) by 0 days.

(21) Appl. No.: 17/767,795

(22) PCT Filed: Oct. 15, 2020

(86) PCT No.: PCT/EP2020/079026
§ 371 (c)(1),
(2) Date: Apr. 8, 2022

(87) PCT Pub. No.: WO2021/078624
PCT Pub. Date: Apr. 29, 2021

(65) Prior Publication Data
US 2024/0085382 A1 Mar. 14, 2024

(30) Foreign Application Priority Data
Oct. 25, 2019 (GB) .................................... 1915488

(51) Int. Cl.
*G01N 30/02* (2006.01)
*G01N 15/08* (2006.01)

(52) U.S. Cl.
CPC ....... *G01N 30/02* (2013.01); *G01N 2015/084* (2013.01); *G01N 2015/086* (2013.01)

(58) Field of Classification Search
CPC ............. G01N 15/08; G01N 2015/084; G01N 2015/086; G01N 30/02; B01D 2201/182; B01D 35/147
See application file for complete search history.

(56) References Cited

U.S. PATENT DOCUMENTS 5,338,448 A * 8/1994 Gjerde .................. G01N 30/14
96/101
7,732,216 B2 * 6/2010 Nochumson ........... G01N 30/89
436/161

(Continued)

FOREIGN PATENT DOCUMENTS

JP S5937445 A 2/1984
JP H0593258 A 4/1993

(Continued)

OTHER PUBLICATIONS

PCT International Search Report and Written Opinion for PCT/EP2020/079026, mailed Jan. 13, 2021 (18 pages).

(Continued)

*Primary Examiner* — Andre J Allen
(74) *Attorney, Agent, or Firm* — Eversheds-Sutherland (US) LLP

(57) ABSTRACT

Disclosed is a system and a method for testing at least one filtration device. The system comprises a chromatography system (3) comprising at least one pair of inlet and outlet chromatography column connections (7a), 7b for at least one chromatography column, and at least one filtration device housing (21) comprising a filtration device (23) to be (Continued)

tested, whereby each filtration device housing (21) is connected to one of the at least one pair of inlet and outlet chromatography column connections (7a, 7b) instead of a chromatography column in the chromatography system.

23 Claims, 6 Drawing Sheets

(56) References Cited

U.S. PATENT DOCUMENTS

| | | | |
|---|---|---|---|
| 2003/0078751 A1 | 4/2003 | Juhasz | |
| 2003/0089664 A1 | 5/2003 | Phillips | |
| 2012/0264221 A1 | 10/2012 | Demmer et al. | |
| 2014/0046038 A1 | 2/2014 | Ishihara | |
| 2015/0246297 A1 | 9/2015 | Bjernulf | |
| 2016/0274019 A1* | 9/2016 | Petersen | G01N 15/082 |
| 2018/0275104 A1 | 9/2018 | Skoglar | |
| 2019/0346412 A1* | 11/2019 | Hyckenberg | G01N 30/8658 |
| 2022/0163493 A1* | 5/2022 | Widehammar | G01N 30/8651 |
| 2023/0191282 A1* | 6/2023 | Rautio | B01D 15/3809 |
| | | | 210/198.2 |

FOREIGN PATENT DOCUMENTS

| | | |
|---|---|---|
| JP | 2000131301 A | 5/2000 |
| WO | 2005088296 A1 | 9/2005 |
| WO | 2005105256 A1 | 11/2005 |
| WO | 2008014237 A2 | 1/2008 |
| WO | 2012017197 A1 | 2/2012 |
| WO | 2013014193 A1 | 1/2013 |
| WO | 2014031070 A1 | 2/2014 |
| WO | 2017055460 A1 | 4/2017 |

OTHER PUBLICATIONS

GB Search Report for GB1915488.9, mailed Apr. 8, 2020 (4 pages).
Luis Raiado Pereira, et al: "Hydrophobic interaction membrane chromatography for plasmid DNA purification: Design and optimization", Journal of Separation Science, Mar. 19, 2010.
Lee R Bink, et al: "Using In-Line Disposable Pressure Sensors to Evaluate Depth Filter Performance", Feb. 28, 2010, Retrieved from the Internet: URL:https://www.pendotech.com/BioProcessIntl_Feb2010.pdf, whole document.
Japanese Office Action for JP Application No. 2022-524014, mailed Mar. 11, 2024 (11 pages, English translation).
European Office Action for EP Appliction No. 20792639.5, mailed Mar. 15, 2024 (8 pages).
Qalyoubi Liyan et al: "Recent progress and challenges on adsorptive membranes for the removal of pollutants from wastewater. Part I: Fundamentals and classification of membranes", Case Studies in Chemical and Environmental Engineering, vol. 3, Jun. 1, 2021 (Jun. 1, 2021), p. 100086.

* cited by examiner

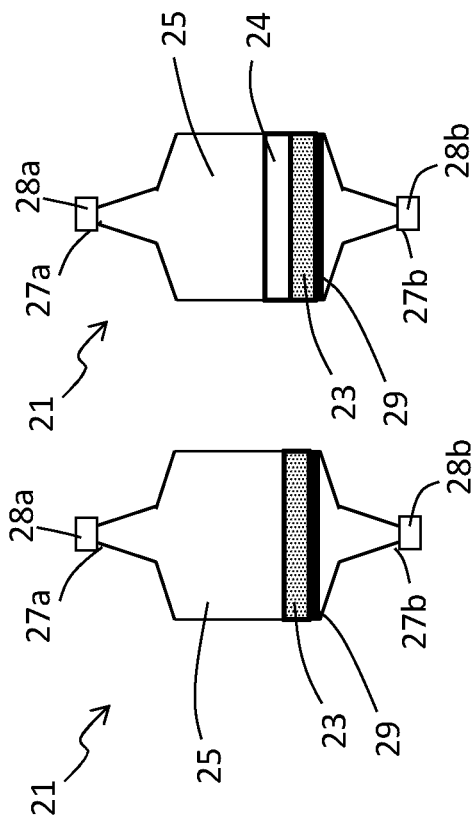
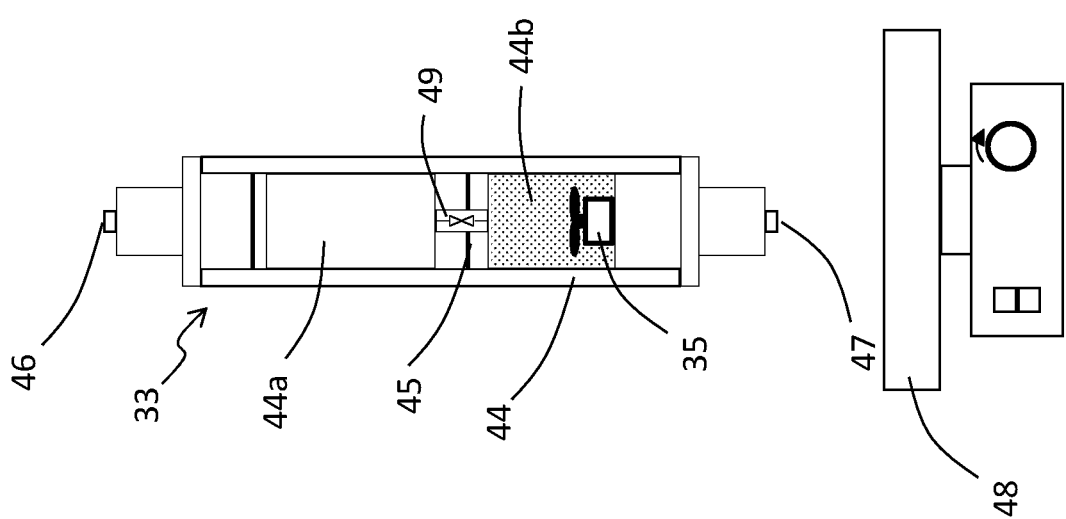
FIG. 3b
FIG. 3a
FIG. 2

TESTING OF FILTRATION DEVICE

CROSS REFERENCE TO RELATED APPLICATIONS

This application claims the priority benefit of PCT/EP2020/079026, filed on Oct. 15, 2020, which claims the priority benefit of GB Application No. 1915488.9 filed on Oct. 25, 2019, the entire contents of which are incorporated herein by reference.

TECHNICAL FIELD OF THE INVENTION

The present invention relates to a system and a method for testing at least one filtration device. It further relates to a filtration device housing.

BACKGROUND

Screening and testing of filters, for example depth filters can be very time consuming. Various filters with different properties exist and thus many different filters may have to be screened until an appropriate filter is found. Furthermore low filter capacities or absorption of a given target protein to the filter matrix may result in testing lots of different filters. Furthermore a large volume of filtration feed is needed for the testing both because available filter sizes are big and as explained many filters need to be screened.

SUMMARY

An object of the present invention is to provide an improved method and system for testing and/or screening filtration devices.

A further object of the present invention is to provide a more effective method for testing filtration devices and a system by which a more effective testing of filtration devices can be provided.

This is achieved by a method, a system and a filtration device housing according to the independent claims.

According to one aspect of the invention a system for testing at least one filtration device is provided, said system comprising:
  a chromatography system comprising at least one pair of inlet and outlet chromatography column connections for at least one chromatography column; and
  at least one filtration device housing comprising a filtration device to be tested, whereby each filtration device housing is connected to one of the at least one pair of inlet and outlet chromatography column connections instead of a chromatography column in the chromatography system.

According to another aspect of the invention a method for testing at least one filtration device is provided. Said method comprises using a chromatography system for the testing.

According to another aspect of the invention a filtration device housing configured for being connectable to a chromatography system is provided, where said filtration device housing is configured to be connected to the chromatography system at a chromatography column position. Said filtration device housing comprises:
  a filtration device which should be tested;
  an inlet configured for receiving sample feed into the filtration device housing for passing through the filtration device, said inlet being provided with a first connection configured for being connectable to a chromatography system; and
  an outlet configured for transferring sample feed out from the filtration device housing after having passed through the filtration device, said outlet being provided with a second connection configured for being connectable to a chromatography system.

Hereby an effective, and at least in some aspects automated, testing of filtration devices can be provided. The same sample feed can be used for testing a number of filtration devices which can be connected to the chromatography system. All analytics available in the chromatography system can be used for the evaluation of the filtration devices, such as for example pressure sensors and UV sensors which will give valuable information for the evaluation of the filtration devices. Furthermore the chromatography system is possible to sanitize between different screenings. Furthermore the fraction collector of the chromatography system can be used for collecting fractions of the sample feed after having passed the at least one filtration device housing. Hereby further analysis of the sample feed having passed the filtration devices can easily be done and hereby further analysis of the filtration device features and filtration device performance can be performed.

In one embodiment of the invention said chromatography system further comprises a sample feed inlet, a pump system for pumping sample feed through connected chromatography columns and pressure sensors configured for measuring pressures at an inlet side and an outlet side of a connected chromatography column.

In one embodiment of the invention said filtration device comprises one or more of a depth filter, a sterile filter and a chromatography media.

In one embodiment of the invention an effective area of said filtration device is smaller than 3 $cm^2$ or smaller than 2 $cm^2$. Hereby a low amount of sample feed is needed for the testing. Thus less feed for the filters is required and more filter devices of various types can be tested with the same feed material.

In one embodiment of the invention the pump system comprises a pump and a sample loop, wherein said sample loop comprises a housing comprising a pump fluid compartment and a sample feed compartment which are separated from each other by a plunger provided in the housing, wherein said pump fluid compartment comprises a pump fluid inlet which can be connected to the pump and said sample feed compartment comprises a sample feed outlet which is connected to the sample feed inlet of the chromatography system, whereby the plunger can be moved by the pump such that sample feed provided in the sample feed compartment is pushed out through the sample feed outlet without any contact with the pump fluid.

In one embodiment of the invention said sample feed compartment of said sample loop comprises a magnetically driven stirring device. Hereby a homogenous distribution of particles in the sample feed to be provided to the filtration devices to be tested can be ensured.

In one embodiment of the invention the system comprises more than one filtration device housings and the chromatography system further comprises one or more valves for controlling the sample feed through the connected filtration device housings one after each other. Hereby the same sample feed can be used for testing more than one filtration devices in a convenient and effective way.

In one embodiment of the invention said valve can be set in different flow control positions allowing reversing of the flow direction through said connected filtration device housings. Hereby air possibly provided above the filtration device can be replaced by for example washing buffer.

In one embodiment of the invention the chromatography system further comprises at least one UV detector configured for measuring UV absorbance of the sample feed after having passed through the filtration device housing.

In one embodiment of the invention the chromatography system further comprises a fraction collector for collecting fractions of the sample feed after having passed the at least one filtration device housing. Hereby further analysis of the sample feed having passed the filtration devices can be provided for evaluation of filtration device properties.

In one embodiment of the invention the filtration device housing comprises a depth filter or a functionalized chromatography media or a combination of those.

In one embodiment of the invention the at least one filtration device housing comprises:
- a housing part in which the filtration device is provided, whereby the filtration device has an outer circumference which fits closely inside the housing part;
- an inlet configured for receiving sample feed into the cylindrical housing part; and
- an outlet configured for transferring sample feed out from the cylindrical housing part after having passed through the filtration device.

In one embodiment of the invention the chromatography system further comprises an injection valve connected to the sample feed inlet and connectable to a buffer source, whereby said injection valve can be positioned for flushing buffer through the at least one filtration device housing or for providing sample feed through the at least one filtration device housing.

In one embodiment of the invention said method further comprises the steps of.
- connecting at least one filtration device housing comprising a filtration device to be tested to the chromatography system at a position intended for a chromatography column in the chromatography system;
- pumping sample feed through the at least one filtration device housing; and
- measuring pressure in the sample feed before and after the at least one filtration device housing.

In one embodiment of the invention the method further comprises the step of flushing a buffer through the filtration device housing before pumping sample feed through the filtration device housing.

In one embodiment of the invention the method further comprises the step of measuring UV absorption of the sample feed after having passed the at least one filtration device housing.

In one embodiment of the invention the method further comprises the step of sanitizing the chromatography system between different tests of filtration devices.

In one embodiment of the invention the method further comprises the step of fractionating the sample feed after having passed the at least one filtration device housing.

In one embodiment of the invention the method is a method for testing filtration devices having an effective area smaller than 3 cm$^2$ or smaller than 2 cm$^2$.

In one embodiment of the invention the filtration device housing further comprises a housing part in which the filtration device is provided, whereby the filtration device has an outer circumference which fits closely inside the housing part.

In one embodiment of the invention the filtration device housing comprises a depth filter, a sterile filter or a functionalized chromatography media or a combination of those.

BRIEF DESCRIPTION OF THE DRAWINGS

FIG. 2 shows schematically a sample loop provided in the chromatography system according to one embodiment of the invention.

FIG. 3a shows schematically a filtration device housing according to one embodiment of the invention.

FIG. 3b shows schematically a filtration device housing according to another embodiment of the invention.

DETAILED DESCRIPTION OF EMBODIMENTS

According to the invention a method is provided for testing at least one filtration device, where the method comprises using a chromatography system for the testing. By using an already existing chromatography system for screening and testing of different filtration devices, such as for example depth filters, sterile filters, chromatography media or a combination of such filter types, an effective method is provided for the evaluation of different filter properties. Analytic components already provided in the chromatography system can be used for the evaluation, such as pressure sensors for evaluating a delta pressure over the filtration devices and UV sensors for measuring UV absorbance of the sample feed flowed through the filtration devices. Hereby an effective and to some degree automated testing method for filtration devices is provided.

Figure 1A:
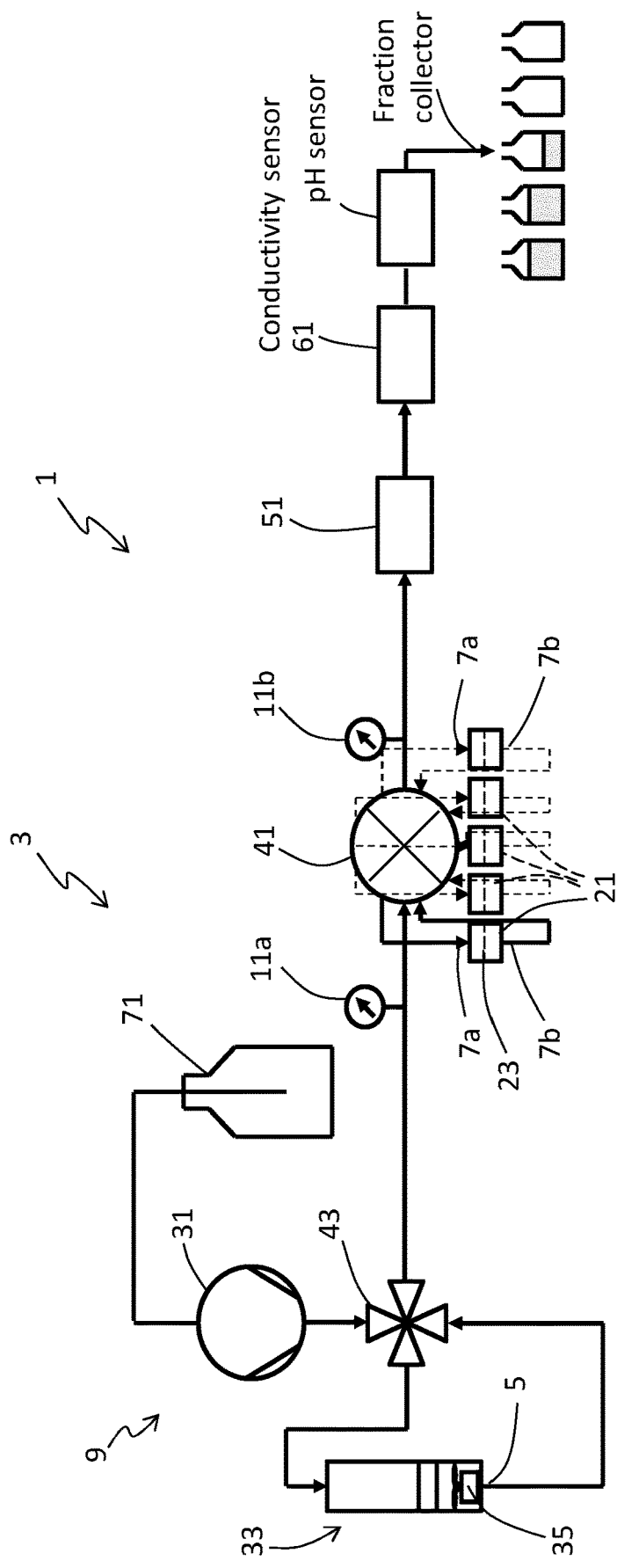
FIG. 1a shows schematically a system for testing at least one filtration device according to one embodiment of the invention.

FIG. 1a shows schematically a system 1 for testing at least one filtration device 23 according to one embodiment of the invention. The system 1 comprises a chromatography system 3 comprising at least one pair of inlet and outlet chromatography column connections 7a, 7b for at least one chromatography column. A number of pairs of inlet and outlet chromatography column connections 7a, 7b can be provided in the chromatography system 3 for allowing connection of a number of chromatography columns. According to the invention the system 1 comprises also at least one filtration device housing 21 comprising a filtration device 23 to be tested. Each filtration device housing 21 is connected to one of the at least one pair of inlet and outlet chromatography column connections 7a, 7b instead of a chromatography column in the chromatography system 3, i.e. at the positions of the chromatography system 3 where chromatography columns can be connected one or more filtration device houses 21 are connected instead. Hereby the chromatography system and all its analytical functions, such as for example pressure sensors and UV sensors can be used for evaluating properties of different filtration devices in a screening process for testing filtration devices. Hereby an effective and to some extent automated method and system for testing filtration devices is achieved. Furthermore the same sample feed can be used in a convenient way for the testing of different filtration devices which will give a robust and reliable testing method. Even further the chromatography system 3 can be easily sanitized between different tests.

The chromatography system 3 comprises in this embodiment a sample feed inlet 5 and a pump system 9 for pumping sample feed through possibly connected chromatography columns, or in this case through connected filtration device housings 21. The chromatography system 3 comprises furthermore pressure sensors 11a, 11b which are configured for measuring pressures at an inlet side and an outlet side of a connected chromatography column, or as in this case connected filtration device housings 21.

The filtration device comprises one or more of a depth filter, a sterile filter and a chromatography media. Hereby different types of depth filters or sterile filters can be tested according to the invention. Another possibility is to test different chromatography media, for example functionalized chromatography media or a combination of for example a depth filter and a functionalized chromatography media. The chromatography media could be any suitable type such as resin, membrane or nanofibre adsorbent (e.g. as disclosed in EP3055059B1).

The filtration device is suitably provided having a small effective area compared to the size of conventionally available filters. Testing smaller filters is favorable as less material is required for the filtration and thus more filtration devices differing in their properties can be tested. An effective area of the filtration devices 23 can in one embodiment of the invention for example be smaller than 3 cm$^2$ and in another embodiment of the invention smaller than 2 cm$^2$ or even smaller than 1 cm$^2$.

The pump system 9 comprises in this embodiment of the invention a pump 31 and a sample loop 33. The sample loop 33 is shown schematically in more detail in FIG. 2. The sample loop 33 comprises a housing 44 which comprises a pump fluid compartment 44a and a sample feed compartment 44b which are separated from each other by a plunger 45 provided in the housing 44. The pump fluid compartment 44a comprises a pump fluid inlet 46 which can be connected to the pump 31. Hereby pump fluid can be pumped into the pump fluid compartment 44a by the pump 31. The plunger 45 constitutes a sealed separation wall between the pump fluid compartment 44a and the sample feed compartment 44b and can slide inside the housing 44 thereby changing the sizes of the pump fluid compartment and the sample feed compartment. The plunger 45 can in some embodiments comprise a valve 49 to prevent overpressure when stopped by allowing a flow from the pump fluid compartment 44a into the sample feed compartment 44b.

The sample feed compartment 44b comprises a sample feed outlet 47 which is connected to the sample feed inlet 5 of the chromatography system 3, whereby the plunger 45 can be moved by the pump 31 such that sample feed provided in the sample feed compartment 44b is pushed out through the sample feed outlet 47 without any contact with the pump fluid. Hereby a sample feed compartment 44b is provided which is separated from the pump fluid but still controlled by the pump. Hereby system contact with the sample feed is limited. In another embodiment of the invention no sample loop 33 is provided but the pump system 9 comprises instead a diaphragm pump with a disposable pump head. This would be an alternative way of limiting system contact of the sample feed.

In this embodiment of the invention the sample feed compartment 44b of said sample loop 33 comprises a magnetically driven stirring device 35. The pump system 9 of the chromatography system 3 comprises furthermore in this embodiment a magnetic stirrer 48 configured for magnetically controlling a stirring motion of the magnetically driven stirring device 35. Stirring the sample feed is advantageous in order to ensure a homogenous distribution of particles in the sample feed to be provided to the filtration devices to be tested.

The chromatography system 3 further comprises one or more column valves 41 for controlling the sample feed through any connected chromatography columns one after each other. However, in the system 1 according to the invention filtration device housings 21 are connected via the column valve 41 instead for chromatography columns. Said column valve 41 can be set in different flow control positions allowing reversing of the flow direction through said connected filtration device housings 21. A reversed flow through the filtration device housings 21 is shown in FIG. 1b which will be further described below.

The chromatography system 3 comprises suitably also at least one UV detector 51 configured for measuring UV absorbance of the sample feed after having passed through the filtration device housing 21. The chromatography system 3 may also comprise a conductivity sensor 52a and a pH sensor 52b. Furthermore the chromatography system 3 may comprise a fraction collector 61 for collecting fractions of the sample feed after having passed the at least one filtration device housing 21. This can be suitable if further analysis of the sample feed having passed the filtration devices is needed for evaluation of filtration device properties. Hereby many functions which are already provided in a conventional chromatography system can be used for the testing and screening of filtration devices.

The chromatography system 3 further comprises an injection valve 43 connected to the sample feed inlet 5 and connectable to a buffer source 71. Said injection valve 43 can be positioned for flushing buffer through the at least one filtration device housing 21 or for providing sample feed through the at least one filtration device housing.

Figure 1B:
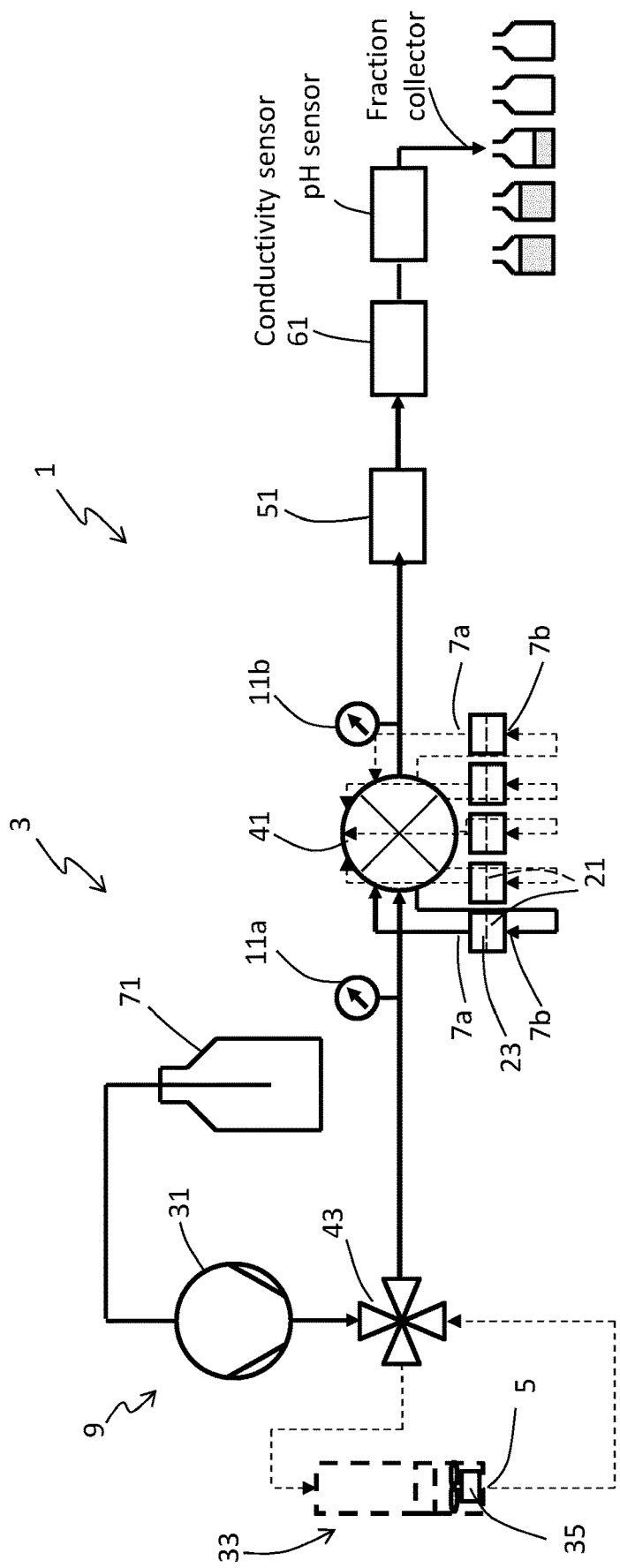
FIG. 1b shows the same system as showed in FIG. 1a but in another position where a buffer is flushed through the at least one filtration device before the testing takes place.

FIG. 1b shows the same system as showed in FIG. 1a where the column valve 41 and the injection valve 43 are provided in other positions compared to FIG. 1a and a buffer is flushed through the at least one filtration device. Such a flushing with buffer can suitably be provided before the testing of the filtration devices 23 by use of sample feed takes place. The flushing is hereby suitably performed in an opposite direction over the filtration devices as compared to when sample feed is transferred through the filtration devices. By using the reverse flow, air which may be contained in the filtration device can be replaced by liquid (often washing buffer). This can be important as it is very difficult to remove air above the filtration device in a regular (top-to-bottom) flow direction.

Two different embodiments of a filtration device housing 21 are schematically shown in more detail in FIGS. 3a and 3b. Most of the features are common for both the embodiments and are given the same reference numbers. The filtration device housing 21 is configured for being connectable to a chromatography system 3, where said filtration device housing 21 is configured for connection to a chromatography system 3 at a chromatography column position, i.e. to a pair of inlet and outlet chromatography column connections 7a, 7b of the chromatography system 3. The filtration device housing 21 comprises a filtration device 23 which should be tested. The filtration device can be for example a depth filter, a sterile filter or a functionalized chromatography media or a combination of those as described above. The filtration device housing 21 further comprises an inlet 27a configured for receiving sample feed into the filtration device housing 23 for passing through the filtration device 23, said inlet 27a being provided with a first connection 28a configured for being connectable to an inlet chromatography column connection 7a of a chromatography system 3. The filtration device housing 21 comprises also an outlet 27b configured for transferring sample feed out from the filtration device housing 21 after having passed through the filtration device 23, said outlet 27b being provided with a second connection 28b configured for being connectable to an outlet chromatography column connection 7b of a chromatography system 3. A distance ring 29 can in some embodiments be provided between the outlet 27b and the filtration device 23. The distance ring 29 can be configured for avoiding displacement of the filtration device 23 within the filtration device housing 21 and for avoiding that the filtration device is pressed against the bottom of the filtration device housing 21.

The filtration device housing 21 further comprises a housing part 25 in which the filtration device 23 is provided, whereby the filtration device 23 has an outer circumference which fits closely inside the housing part 25. The housing part 25 can be cylindrical, whereby also the filtration device 23 has a cylindrical form having substantially the same diameter as an inner diameter of the cylindrical housing part 25. However also other geometries of the housing part 25 and the filtration device 23 than cylindrical are possible.

The filtration device 23 is suitably small as discussed above, for example an effective area of the filtration device can be smaller than 3 cm$^2$ or smaller than 2 cm$^2$.

Figure 4:
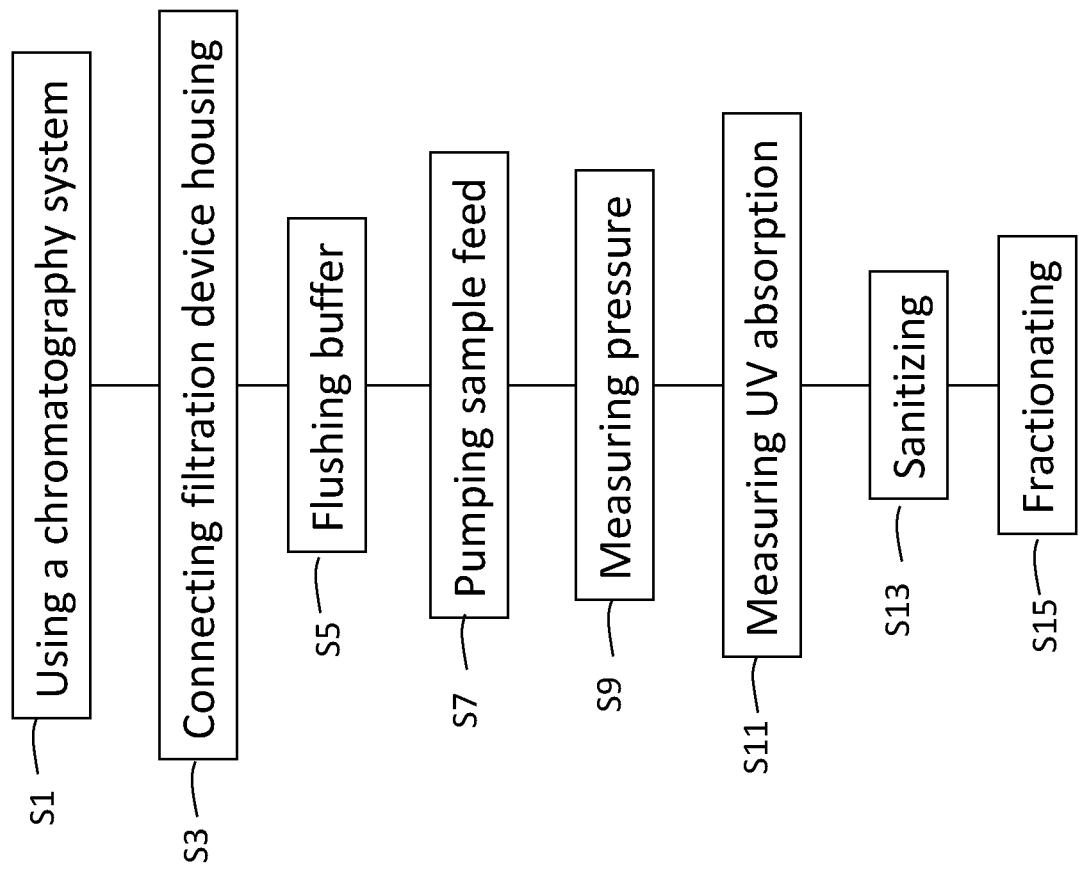
FIG. 4 is a flow chart of a method for testing at least one filtration device according to one embodiment of the invention.

FIG. 4 is a flow chart of a method for testing at least one filtration device according to one embodiment of the invention. The method steps are described in order below:
S1: Using a chromatography system 3 for the testing.
S3: Connecting at least one filtration device housing 21 comprising a filtration device 23 to be tested, to the chromatography system 3 at a position intended for a chromatography column in the chromatography system.
S5: Flushing a buffer through the filtration device housing 21 before pumping sample feed through the filtration device housing 21. This step is optional.
S7: Pumping sample feed through the at least one filtration device housing 21.
S9: Measuring pressure in the sample feed before and after the at least one filtration device housing 21.

In some embodiments of the invention the method further comprises one or more of the optional steps:
S11: Measuring UV absorption of the sample feed after having passed the at least one filtration device housing 21.
S13: Sanitizing the chromatography system 3 between different tests of filtration devices 23.
S15: Fractionating the sample feed after having passed the at least one filtration device housing 21.

Figure 5B:
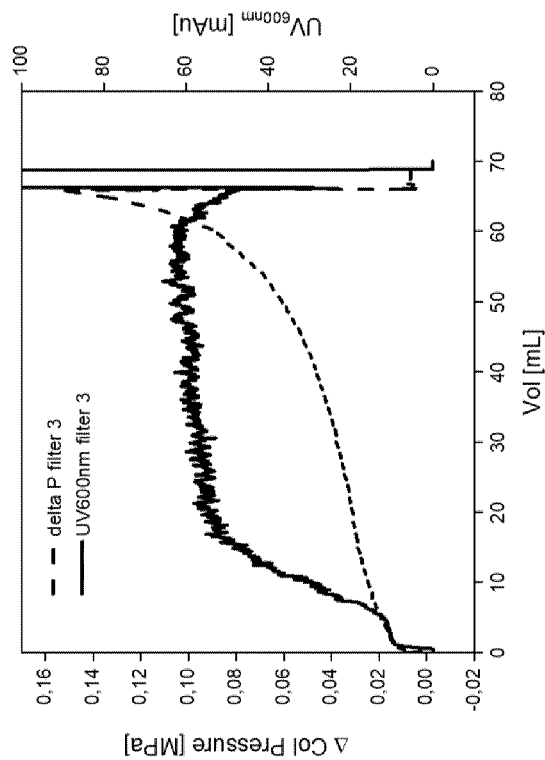
FIG. 5b is a diagram showing both delta column pressure and UV absorption for one of the filtration devices when tested according to the invention.
Figure 5A:
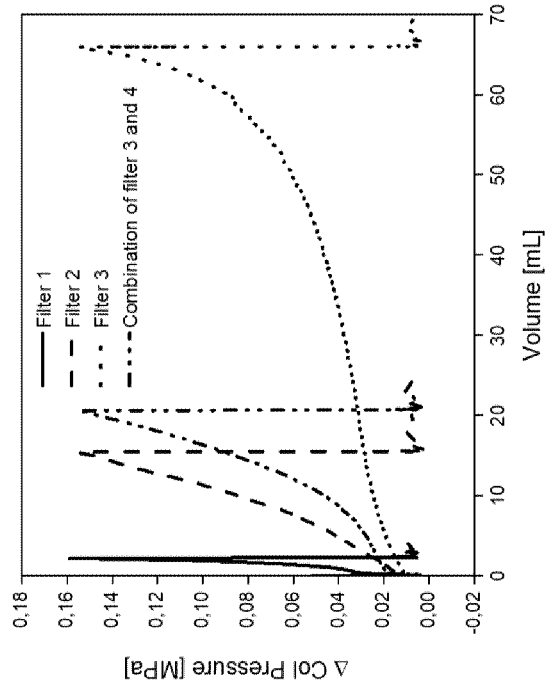
FIG. 5a is a diagram showing delta column pressure for different types of filtration devices when tested according to the invention.

FIGS. 5a and 5b are diagrams showing some experimental data from testing of filtration devices according to one embodiment of the invention. FIG. 5a is a diagram showing delta column pressure for four different types of filtration devices 23 when tested according to the invention. FIG. 5b is a diagram showing both delta column pressure and UV absorption for one of the filtration devices 23 when tested according to the invention.

FIG. 5a shows delta column pressure measured during the filtration process of CHO cell culture supernatant using different depth filter types with increasing particle retention ratings from filter 1 (EKMP), 2 (K200) and 3 (K700). As maximum a pressure of 0.16 MPa was set where the depth filtration process was automatically aborted by the chromatography system; here defined as filtration volume. The figure shows that the filtration volume increases as expected with increasing retention rating and that different depth filter types can clearly be distinguished from each other. A combination of filter 2 and 3 is illustrated as dash dot dotted line indicating, that the addition of a suitable layer with higher retention rating can increase the filtration volume compared to the single depth filter 2. The depth filter area of the tested devices was 0.79 cm$^2$.

FIG. 5b shows delta column pressure on the left y-axis and absorbance at 600 nm on the right y-axis measured during the filtration process of CHO cell culture using filter 3 (see FIG. 5a). This figure illustrates the filtration process of a filter material where the retention rating was chosen too high. The increase in UV600 nm signal indicates that particles are able to pass the filter. As the pressure continuously increases with increasing filtration volume a filter cake is built up. This filter cake gets dense enough to also retain particles which is indicated by a decreasing UV600 nm signal at a filtration volume of approximately 60 mL. The depth filter area of the tested device was 0.79 cm$^2$.

According to another embodiment of the invention a method for testing filtration devices by using a liquid handling station 55 is provided. I.e. instead of using a chromatography system a liquid handling station is used for the testing. Hereby a number of filtration devices, such as for example depth filters, sterile filters or chromatography material or a combination of those as discussed above, can be effectively tested in parallel. The sample feed can hereby be provided in parallel from the liquid handling station 55 to the filtration devices.

Figure 6:
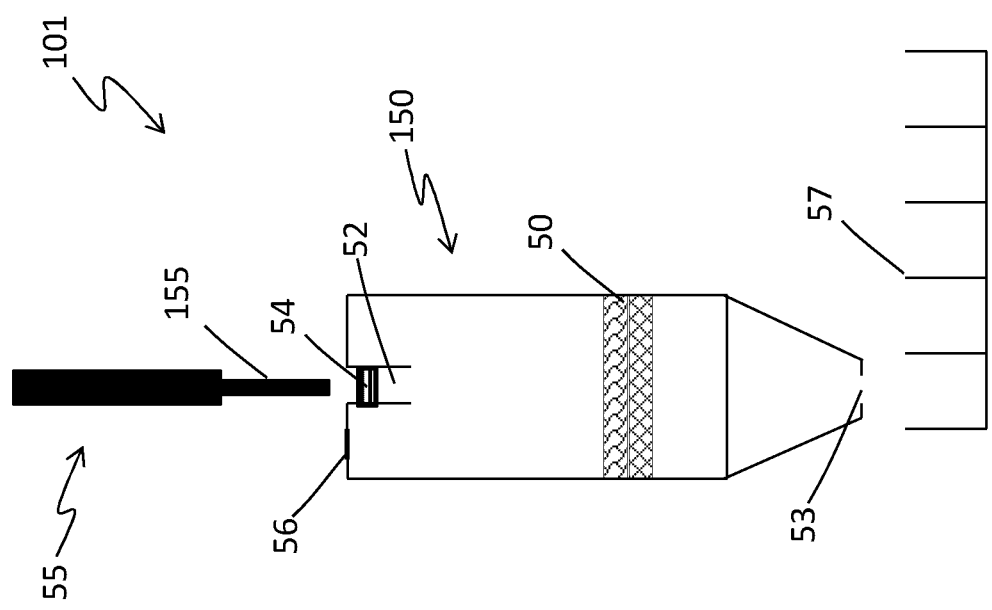
FIG. 6 shows schematically a system for testing filtration devices according to another embodiment of the invention.

FIG. 6 shows schematically a system 101 for testing filtration devices 50 according to such an embodiment of the invention. This system 101 comprises a liquid handling station 55 and a number of filtration device housings 150. The filtration device housings 150 can be provided in the form of small tubes in which the filtration devices 50 are provided, one filtration device 50 in each filtration device housing 150. The filtration device housing 150 comprises an inlet 52 and outlet 53 between which the filtration device 50 is provided. Liquid e.g. buffer or feed can be provided at the inlet 52 of the filtration device housing 150 using a liquid handling station 55. A sealing 54 (e.g. an O-ring) is provided at the inlet 52 where a needle 155 of the liquid handling station 55 can penetrate into the filtration device housing 150 for delivering the sample feed. The sealing 54 prevents leakage at the inlet 52 with increasing pressure. To remove air during a possible initial flushing step a valve 56 (e.g. a hydrophobic membrane) can be provided at a top part of the filtration device housing 150. This valve 56 closes when it is soaked with liquid and also serves as a rupture disc which breaks when a maximum backpressure of the filtration device 50 is reached. The occurring leakage after rupture disc breaking can be drained by a channel. Fractions can be taken automatically by the liquid handling robot in microtiter plates 57.

The invention claimed is:
1. A system for testing at least one filtration device, said system comprising:
a chromatography system comprising at least one pair of inlet and outlet chromatography column connections for at least one chromatography column; and
at least one filtration device housing comprising a filtration device to be tested, whereby the at least one filtration device housing is connected to one of the at least one pair of inlet and outlet chromatography column connections instead of a chromatography column in the chromatography system.

2. The system according to claim 1, wherein said chromatography system further comprises a sample feed inlet, a pump system for pumping sample feed through connected filtration device housings and pressure sensors configured for measuring pressures at an inlet side and an outlet side of a connected chromatography column.

3. The system according to claim 1, wherein said filtration device comprises one or more of a depth filter, a sterile filter and a chromatography media.

4. The system according to claim 1, wherein an effective area of said filtration device is smaller than 3 $cm^2$ or smaller than 2 $cm^2$.

5. The system according to claim 1, wherein the pump system comprises a pump and a sample loop, wherein said sample loop comprises a housing comprising a pump fluid compartment and a sample feed compartment which are separated from each other by a plunger provided in the housing, wherein said pump fluid compartment comprises a pump fluid inlet which can be connected to the pump and said sample feed compartment comprises a sample feed outlet which is connected to the sample feed inlet of the chromatography system, whereby when the plunger is moved by the pump sample feed provided in the sample feed compartment is pushed out through the sample feed outlet without any contact with the pump fluid.

6. The system according to claim 5, wherein said sample feed compartment of said sample loop comprises a magnetically driven stirring device.

7. The system according to claim 1, wherein the system comprises more than one filtration device housings and wherein the chromatography system further comprises one or more valves for controlling the sample feed through the connected filtration device housings one after each other.

8. The system according to claim 7, wherein said valve can be set in different flow control positions allowing reversing of the flow direction through said connected filtration device housings.

9. The system according to claim 1, wherein the chromatography system further comprises at least one UV detector configured for measuring UV absorbance of the sample feed after having passed the filtration device housing.

10. The system according to claim 1, wherein the chromatography system further comprises a fraction collector for collecting fractions of the sample feed after having passed the at least one filtration device housing.

11. The system according to claim 1, wherein the filtration device housing comprises a depth filter or a functionalized chromatography media or a combination of those.

12. The system according to claim 1, wherein the at least one filtration device housing comprises:
a housing part in which the filtration device is provided, whereby the filtration device has an outer circumference which fits closely inside the housing part;
an inlet configured for receiving sample feed into the cylindrical housing part; and
an outlet configured for transferring sample feed out from the cylindrical housing part after having passed through the filtration device.

13. The system according to claim 1, wherein the chromatography system further comprises an injection valve connected to the sample feed inlet and connectable to a buffer source, whereby said injection valve can be positioned for flushing buffer through the at least one filtration device housing or for providing sample feed through the at least one filtration device housing.

14. A method for testing at least one filtration device, said method comprising:
connecting at least one filtration device housing comprising a filtration device to be tested to the chromatography system at a position intended for a chromatography column in the chromatography system;
pumping sample feed through the at least one filtration device housing; and
measuring pressure in the sample feed before and after the at least one filtration device housing.

15. The method according to claim 14, further comprising the step of flushing a buffer through the filtration device housing before pumping sample feed through the filtration device housing.

16. The method according to claim 14, further comprising the step of measuring UV absorption of the sample feed after having passed the at least one filtration device housing.

17. The method according to claim 14, further comprising the step of sanitizing the chromatography system between different tests of filtration devices.

18. The method according to claim 14, further comprising the step of fractionating the sample feed after having passed the at least one filtration device housing.

19. The method according to claim 14, wherein the method is a method for testing filtration devices having an effective area smaller than 3 $cm^2$ or smaller than 2 $cm^2$.

20. A filtration device housing configured for being connectable to a chromatography system where said filtration device housing is configured to be connected to the chromatography system at a chromatography column position, said filtration device housing comprising:
a filtration device to be tested;
an inlet configured for receiving sample feed into the filtration device housing for passing through the filtration device, said inlet being provided with a first connection configured for being connectable to a chromatography system; and
an outlet configured for transferring sample feed out from the filtration device housing after having passed through the filtration device, said outlet being provided with a second connection configured for being connectable to a chromatography system.

21. The filtration device housing according to claim 20, further comprising a housing part in which the filtration device is provided, whereby the filtration device has an outer circumference which fits closely inside the housing part.

22. The filtration device housing according to claim 20, wherein the filtration device housing comprises a depth filter, a sterile filter or a functionalized chromatography media or a combination of those.

23. The filtration device housing according to claim 20, wherein said filtration device has an effective area smaller than 3 $cm^2$ or smaller than 2 $cm^2$.

* * * * *